Patented Nov. 8, 1938

2,136,296

UNITED STATES PATENT OFFICE 2,136,296

NITROGEN-CONTAINING CELLULOSE DERIVATIVES

Vernal R. Hardy, Wilmington, Del., assignor to E. I. du Pont de Nemours & Company, Wilmington, Del., a corporation of Delaware No Drawing. Application January 31, 1936, Serial No. 61,842

15 Claims. (Cl. 260—152)

This invention relates to new nitrogen-containing cellulose derivatives soluble in dilute acids such as, for example, dilute acetic acid. More particularly, it relates to cellulose derivatives soluble in dilute acetic acid and containing amino-nitrogen removed from the cellulose nucleus by at least one carbon atom. It also relates to methods of producing said nitrogen-containing cellulose derivatives.

It is known that attempts have been made to prepare amino derivatives of cellulose in which the amino group is attached directly to a carbon atom of the cellulose nucleus. Usually, these attempts have involved reacting a cellulose aryl sulfonate with ammonia. They have been only partially successful because, insofar as is known, no high degree of substitution has been disclosed and no products have been prepared which were soluble in dilute acids such as, for example, dilute acetic acid. In general, there have been relatively few processes heretofore described which might lead to the production of amino-cellulose derivatives containing the amino-nitrogen in a side chain, and of these, insofar as is known, none leads to the production of an amino-cellulose derivative which is soluble in dilute acetic acid.

In U. S. Patent 1,777,970 nitrogen-containing, pronouncedly basic cellulose derivatives are prepared by reacting alkali cellulose with aliphatic monohalogen alkyl amines, but in the course of investigations leading to the present invention, it has been found that alkali cellulose does not react with halogen amines in accordance with said process to form products which are soluble in dilute acids.

It has also been proposed in British Patent 344,480 to produce nitrogen-containing cellulose derivatives by (1) reacting the cellulosic hydroxyl groups directly with ammonia or a primary or secondary amine, or (2) treating the hydroxyl groups by known halogenation methods and treating the products with ammonia or a primary or secondary amine. More specifically, the preferred method is exemplified by treating hydroxyethyl cellulose with thionyl chloride followed by treatment of the products with concentrated ammonia, the final product being soluble in acetone and "acetic acid" (concentration not specified).

Likewise, in British Patent 346,806 a process is described for reacting a halogen-containing cellulose derivative with an amine to replace the halogen with an amino group. For example, cellulose is treated with ethylene chlorobromide and the product is reacted with ammonia or organic amines. The amino-cellulose derivatives thus produced are said to have increased affinity for acid dyestuffs. It has been found, however, in the research leading to the present invention that aminocellulose derivatives soluble in dilute acids are not produced when cellulose halides are reacted with ammonia or amines as in British Patents 344,480 and 346,806.

It is an object of the present invention to produce new and improved nitrogen-containing cellulose derivatives soluble in dilute acetic acid and containing amino-nitrogen removed from the cellulose nucleus by a chain of atoms comprising at least one carbon atom. Another object is to provide a new and improved process for producing amino-cellulose derivatives of the character above described. Other objects will appear hereinafter.

In accomplishing these objects, it has been found that amino-cellulose derivatives soluble in dilute acids, such as dilute acetic acid, and having the amino-nitrogen removed from the cellulose nucleus by at least one carbon atom can be prepared by the following methods: (1) reacting an alkali metal cellulosate (prepared by treating cellulose or its derivatives containing residual alcoholic hydroxyl groups with an alkali metal in solution in liquid ammonia) with a monohalogen amine or salt thereof, and isolating the final product; or (2) reacting a cellulose derivative containing as a substituent for the hydrogen of one or more cellulosic hydroxyl groups a hydroxyalkyl group, with an aromatic sulfonyl halide in pyridine or other suitable solvent followed by treatment of the reaction product with a secondary amine, and isolating the final product.

The cellulosic substance used as a starting material in the first process may be illustrated by the general formula:

(1)

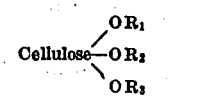

in which $R_1$, $R_2$ and $R_3$ may all represent hydrogen or all hydroxy-alkyl, or one or more of them may be hydrogen and the rest hydroxy-alkyl, or one or two of them may be alkyl, such as methyl or ethyl, or aralkyl, such as benzyl, and the rest hydrogen or hydroxy-alkyl. For example, $R_1$, $R_2$ and $R_3$ may be hydroxymethyl, hydroxypropyl, hydroxybutyl, hydroxydodecyl and higher homologues. The alcoholic hydroxyl may be primary, secondary or tertiary, but primary alcoholic groups are preferred because of their greater reactivity. It is also preferable to employ compounds in which the radicals $R_1$, $R_2$ or $R_3$ contain a relatively small number of carbon atoms, preferably less than seven, because a large number of carbon atoms tends to lessen the acid-solubility of the amino derivatives.

When the amino-cellulose derivatives are prepared by the second process, that is, the process involving the use of an aromatic sulfonyl halide, $R_1$, $R_2$ and $R_3$ cannot all be hydrogen but at least one must be a hydroxy-alkyl radical.

The invention will be further illustrated but is not limited by the following examples in which the quantities are stated in parts by weight unless otherwise indicated.

Example I

Three and twenty-four hundredths (3.24) parts of cellulose (pre-treated by steeping in 10% sodium hydroxide solution at —10° C. for sixteen hours, washing out the caustic, and drying) were added to a solution of 1.15 parts of sodium in 31 parts of dry liquid ammonia. Eight (8) parts of bromopropyldimethylamine hydrobromide ($BrCH_2CH_2CH_2N(CH_3)_2.HBr$) were added, and the reaction mixture was left for twenty hours in a bomb at room temperature. The mixture was then poured into ethanol to precipitate the dimethylaminopropylcellulose, which was filtered, washed with cold water and dried at room temperature. Analysis indicated that the product contained 1.6% nitrogen. The product was readily soluble in 1.5% aqueous acetic acid and in 10% caustic soda solution.

Example II

Glycol cellulose was prepared as follows:
Sixty (60) parts of cotton linters were steeped in 19% sodium hydroxide solution for one hour, pressed to 150 parts and shredded for two hours. Thirty-three (33) parts of ethylene oxide were then added as the vapor at room temperature, and the mixture was agitated for twenty hours at 28° C. in a tumbling machine. The mixture was then washed four times with 95% ethanol containing a little acetic acid and then with 95% ethanol alone six times. It was finally washed twice with ether and dried at 50° C. The product was cream-colored, soft and fibrous. It dissolved in water to form a viscous solution.

Twelve and four-tenths (12.4) parts of this glycol cellulose were dissolved in 62 parts of dry liquid ammonia in a vessel equipped with a mechanical stirrer. Three parts of metallic sodium were added and allowed to react while the mixture was stirred. Some precipitation took place at this point. Sixteen and four-tenths (16.4) parts of bromoethylamine hydrobromide ($BrCH_2CH_2NH_2.HBr$) were added, with stirring, and the precipitate re-dissolved to a clear, colorless, viscous solution. The reaction mixture was then put into a bomb and heated at 50° C. for eight hours, after which it was allowed to stand at room temperature for nineteen hours. It was then removed from the bomb and poured into methanol in order to precipitate the aminocellulose derivative. The precipitated product was washed with methanol and dried. Analysis indicated that it contained 0.8% nitrogen. It was soluble in 1.5% acetic acid. A film of the acetic acid solution became insoluble in the usual solvents, including the dilute acetic acid itself, upon heating for one hour at 100° C. The aminocellulose, however, remained soluble in the acetic acid solution in bulk when heated under the same conditions. The location of the amino-ethyl groups in this product is not definitely known, but it is believed that part of them are attached to the cellulose nucleus and part to the ethyl side chain. In other words, there is probably obtained a mixed aminoethyl-aminoethoxyethyl ether of cellulose.

Example III

Ten (10) parts of glycol cellulose of Example II were dissolved in 56 parts of pyridine. To the solution were added 57 parts of para-toluenesulfonyl chloride, and the reaction mixture was heated in a suitable vessel at 50° C. for twenty-four hours. It was then poured into absolute ethanol in order to precipitate the cellulose derivative. The product was well washed with ethanol and dried.

Four hundredths (0.04) mole of the para-toluenesulfonate of glycol cellulose thus prepared was dissolved in about 1.5 moles of benzyl alcohol, and to the solution was then added 0.33 mole of dibutylamine. The reaction mixture was heated at 100° C. for approximately six hours in a suitable reaction vessel. The dibutylaminoethylcellulose was precipitated from the reaction mixture by pouring it into ether and was then extracted with ethanol. It was a nearly white fibrous product containing 2.1% nitrogen. It was soluble in 10–15% aqueous acetic acid.

In the above product it is possible that there will be some dibutylamino groups attached directly to the cellulose nucleus. The extent to which this may take place will be dependent upon the degree of substitution of the original glycol cellulose, the amount of aryl sulfonyl halide reacted therewith, and the time and temperature of the latter reaction. An increasing number of amino groups will be attached to the nucleus with decreasing degree of substitution of the glycol cellulose, with increased amounts of aryl sulfonyl halide, and with higher temperatures and longer periods of reaction between halide and glycol cellulose. Generally speaking, the aryl sulfonyl halide reacts preferentially with the side chain hydroxyls and does not begin to react with the hydroxyl groups of the nucleus until substantially all the former have been converted to sulfonate groups.

Example IV

Beta-hydroxypropylcellulose was prepared as follows:
Sixty (60) parts of cotton linters pre-treated as in Example II and 43 parts of propylene oxide were reacted as in Example II. The product was white, soft, fibrous, and dissolved in water to yield a viscous solution.

Thirteen and two-tenths (13.2) parts of this beta-hydroxypropylcellulose were substituted for the glycol cellulose in the process of Example II. A product was obtained having properties similar to those of the product of Example II. It may be considered to be a mixed aminoethyl-aminoethoxylpropyl ether of cellulose, though the exact location of the aminoethyl groups is not known.

Example V

The process of Example III was repeated using the same molar quantities (11 parts) of the beta-hydroxypropylcellulose of Example IV in place of the glycol cellulose. A product was obtained which was similar in its properties to the product of Example III. This product may be considered as a dibutylaminopropylcellulose which also has possibly a few dibutylamino groups attached to the cellulose nucleus.

*Example VI*

By repeating Example I, using methyl cellulose containing approximately one methyl group per cellulose unit in place of cellulose itself, a product is obtained which is soluble in dilute acetic acid. This product may be considered as a mixed methyl-dimethylaminopropyl ether of cellulose.

Similarly, the procedures described in Examples I, II, IV and VI may be carried out to produce other amino-celluloses from other halogen alkylamines. In carrying out the reaction according to the first process, that is, in liquid ammonia and in the presence of alkali metals, sodium is preferred as the alkali metal because of its cheapness and availability. It will be understood, however, that other alkali metals such as potassium may be used. In this process, as previously indicated, cellulose or any of its derivatives containing alcoholic hydroxyl groups can be used, because under the conditions of reaction the amino-nitrogen could not be attached directly to the cellulose nucleus, being always separated therefrom by at least one of the carbon atoms linked to the amino-nitrogen.

In practising the invention according to the first process, it is preferable to employ as the starting materials cellulose ethers containing residual alcoholic hydroxyl groups. That is to say, in the formula (1) it is preferable that at least one of the radicals $R_1$, $R_2$ or $R_3$ be a hydroxy-alkyl group, a typical example being glycol cellulose. The other radicals may be, for example, alkyl or aralkyl or hydrogen. It is usually preferable to employ relatively highly substituted cellulose derivatives, that is, cellulose derivatives in which one or two of the radicals $R_1$, $R_2$ and $R_3$ of formula (1) is an organic radical of the type described. For instance, the glycol cellulose of Example II contained about one hydroxy-ethyl group per glucose unit of the cellulose. However, higher ratios up to complete substitution or lower ratios may be used. For example, there may be employed cellulose derivatives which contain substituent groups in ratios as small as one such group per eight cellulose nuclei.

Any monohalogen amine such as, for example, alkyl, aryl, aralkyl or cycloalkyl amines can be reacted in liquid ammonia with an alkali metal alcoholate of any of the cellulose derivatives previously described. However, if the amines contain more than about six carbon atoms, the solubility of the resulting amino-cellulose derivative in dilute acids is greatly impaired or destroyed. It is therefore preferable to use amines containing less than seven carbon atoms. It is also preferable to use non-aromatic amines because of the adverse effect which aromatic groups such as phenyl have upon the basicity of the amines and of the cellulose derivatives which are prepared therefrom. The amine may be primary, secondary or tertiary. Examples of halogen amines suitable for this invention are chloromethylamine, alpha-chloroethylamine, beta-chloroethylamine, ethyl-beta-chloroethylamine, ethyl-beta-chloropropylamine, diethyl-beta-chloroethylamine, or the corresponding bromo compounds; any of the monohalogen propyl or isopropylamines and higher homologues. The hydrohalides of any of the halogen amines can be used in place of the amines themselves; in fact, it is usually desirable, as illustrated in the examples, to use the hydrohalides because of the instability of the free halogen amines and the tendency of the halogen to react with the free amino groups.

Reaction temperatures varying from the temperature of liquid ammonia ($-33°$ C.) to $100°$ C. or even higher may be used. It is not usually necessary to heat the reaction mixtures at all, since in many cases the reactants can be mixed in an open vessel, allowed to react at the boiling point of liquid ammonia, and the ammonia allowed to escape, leaving the reaction product. For convenience, it is often desirable to heat the reaction mixtures moderately in order to speed up the reaction.

It is important in this liquid ammonia process to use the alkali metal cellulosate (e. g., sodium cellulosate) or the alkali metal "alchoholate" of the cellulose derivative containing residual hydroxyl groups. Thus, when starting with glycol cellulose, the alkali metal alcoholate of hydroxyethyl cellulose is first prepared. It is necessary to use alkali metal alchoholates of the cellulose derivatives to be employed because it has been found in these investigations that alkali cellulose itself does not react with halogen amines in liquid ammonia to form derivatives soluble in dilute acids.

When the amino-cellulose derivatives are prepared by the aromatic sulfonyl halide process, cellulose itself is not used as a starting material. The cellulose derivatives employed as starting materials in this case contain one or more hydroxy-alkyl groups substituted for hydrogen of the cellulosic hydroxyl groups. In general, no limit can be placed on the degree of substitution of the hydroxy-alkyl groups in the cellulose nucleus. Thus, hydroxy-alkyl cellulose derivatives containing as little as one hydroxy-alkyl group per eight cellulose nuclei may be used in this process, and cellulose derivatives containing any ratio of hydroxy-alkyl to cellulose groups from one to eight to three to one are included within the scope of the invention.

In place of para-toluene sulfonyl chloride, its obvious equivalents can be used, for example, benzenesulfonyl chloride, beta-naphthalenesulfonyl chloride and, so far as is known, any other aryl sulfonyl halide.

In this process, other tertiary amines can be used wholly or in part to replace pyridine. The reaction may also be carried out in the presence of other non-reactive organic solvents.

Any secondary amine, for example, an alkyl, hydroxyalkyl, cycloalkyl, aryl or aralkyl amine may be reacted with the cellulose derivative toluenesulfonates. Primary amines are not satisfactory in this process because they tend to form cross-linked cellulose derivatives which are not soluble in dilute acids, and tertiary amines, having no replaceable hydrogen, do not react with the cellulose derivative toluene sulfonates.

In either of the processes described above, the reaction time may be varied over relatively wide limits, depending upon such factors as the reaction temperatures and the type of reactants. In carrying out the first process, it is usually desirable to dissolve or disperse the cellulose or its derivative containing residual alcoholic hydroxyl groups in liquid ammonia and then add enough sodium or alkali metal to react with the desired number of hydroxy groups. The desired mono-halogen amine or its hydrohalide is then added to the reaction mixture, which is conveniently heated at about 60° C. in an autoclave for six to eight hours. The reaction product is isolated in any suitable manner, for example, by pouring the reaction mixture into ethanol or methanol to precipitate the amino-cellulose derivative, washing and drying.

In the alternative process, it is preferable to heat the cellulose derivatives containing a hydroxy-alkyl group in place of a hydrogen of a cellulosic hydroxy group, with an aromatic sulfonyl halide, such as para-toluene sulfonyl chloride, in a suitable reaction medium such as pyridine at about 50° C., and then treat the resultant sulfonic ester of the cellulose derivative in a suitable solvent such as benzyl alcohol, with an excess of the secondary amine. The reaction mixture is then preferably heated at about 100° C. for approximately six hours and the amino-cellulose derivative isolated by any suitable means, e. g., by precipitating it by pouring the reaction mixture into diethyl ether.

The new amino derivatives form addition salts by reaction with acids. Among these salts may be mentioned the acetate, formate, propionate, butyrate, lactate and benzoate, also salts of inorganic acids such as the phosphate, hydrochloride, and sulfate.

The products described herein may be formed into various shaped objects, in particular filaments, bristles, and self-supporting films; for example, films cast from solutions of the amino-cellulose derivatives such as N-dihydroxyethyl-aminoethylcellulose (prepared from diethanolamine and glycol cellulose para-toluenesulfonate) are clear, tough and pliable. However, the products of this invention find their most valuable application as coating compositions, which compositions may range from those which are solutions of the amino-cellulose only in aqueous acids or certain organic solvents such as methanol, dioxane, chloroform, and the like, to those which contain very small amounts of the new cellulose derivatives. Typical of the latter are (a) aqueous emulsions of materials liquid under conditions of emulsification, such as oils and waxes, (b) aqueous dispersions of materials solid under the conditions of dispersion, such as pigments, and (c) compositions which contain both solids and liquids, the coating compositions in these three instances containing the amino-cellulose salts as dispersing and/or emulsifying and/or fixing agents. When these compositions are to be used for special purposes, they may contain various appropriate auxiliary agents known to the art, such as mold or mildew inhibitors, wetting agents, antioxidants, plasticizers, softeners, adhesives, insecticides, film-forming materials, thickeners, and the like.

The above compositions are very valuable for all varieties of coating, this word being used in its broadest sense to mean applications not only to impervious objects and surfaces such as metals, but also to porous or fibrous bodies, such as wood, porous stone, brick, plaster, paper, paper pulp, asbestos, felt, cotton, wool, regenerated cellulose, etc., and articles of manufacture therefrom, such as textiles. The above coating compositions also have valuable adhesive properties, and the various coated materials just mentioned may be readily glued to themselves or to one another, usually with application of heat.

Specific illustrations of the use of these coating compositions are as follows. Solutions of the amino-celluloses in acids may be employed as sizes for rayon tire cord to improve its adhesion to rubber, as sizes for transparent sheets of regenerated cellulose to improve the anchorage thereto of printing inks and lacquers, and as water-proof glues in the manufacture of veneers. Coating compositions which are aqueous emulsions of a wax such as paraffin and a fixing agent such as aluminum acetate having, as an emulsifying agent, an amino-cellulose salt such as beta-aminoethoxyethylcellulose, are very valuable for sizing and water-proofing textiles and for affixing acid dyestuffs to paper. With or without the fixing agent, these compositions may also be used for sizing paper, especially as a beater size in the manufacture of chalk-filled paper. Coating compositions which are aqueous dispersions of titanium oxide and/or other finely divided water-insoluble solid (which may be a mildew preventive such as salicylanilide), a wetting agent, a softener, and, as a dispersing agent, beta-aminoethoxyethylcellulose acetate or other amino-cellulose salt, are useful for sizing and delustering fabrics and for fixing the water-insoluble solid thereto.

The new cellulose derivatives described herein have the distinct advantage over the nitrogen-containing cellulose derivatives disclosed in the prior art of being soluble in dilute aqueous acids such as dilute acetic acid. It is thus feasible and convenient to use them in solution in aqueous liquids which are not only cheaper than organic solvents but are free from objectionable toxicity, fire hazards, etc., which characterize many organic solvents. They have the further advantage that their films are usually rendered insoluble by short baking at elevated temperatures, which is a unique characteristic not hitherto possessed by other cellulose derivatives.

The processes herein described are clearly distinguishable from the previously known processes. In the liquid ammonia process, sodium cellulosate or other alkali metal cellulosate or sodium glycol cellulosate (i. e., alkali metal alcoholates of the cellulose or cellulose derivative) are reacted with halogen amines, whereas in the prior processes, alkali cellulose is reacted with halogen amines, or cellulose or cellulose derivative halides are reacted with amines. As already indicated, it has been found that cellulose derivatives soluble in dilute acids do not result when alkali cellulose is used instead of sodium cellulosate, as in U. S. Patent 1,777,970, or when cellulose halides are reacted with amines as in British Patents 344,480 and 346,806. Moreover, no one has heretofore used liquid ammonia, insofar as is known, as reaction media for preparing nitrogen-containing cellulose derivatives. The aromatic sulfonyl halide process is distinguishable from the previous processes in that the products contain amino-nitrogen separated from the cellulose nucleus by at least one carbon atom, whereas in the previous processes it appears that the nitrogen is attached directly to the cellulose nucleus. Furthermore, products obtained in accordance with previous processes were not soluble in dilute acetic acid.

By the expression "soluble in dilute acetic acid" is meant soluble to the extent of at least one part of solid in 99 parts of aqueous acetic acid of some concentration in the range of 1.5–20%.

By an "amino-alkyl cellulose" is meant an alkyl ether of cellulose in which the amino-nitrogen is removed from the cellulose nucleus by the alkyl chain. This is to be distinguished from an alkylamino cellulose in which the amino-nitrogen is attached to a carbon atom of the cellulose and the alkyl radical is in turn attached to the amino-nitrogen.

As many apparently widely different embodiments of this invention may be made without departing from the spirit and scope thereof, it is to be understood that I do not limit myself to the specific embodiments thereof except as set forth in the appended claims.

I claim:

1. The process which comprises reacting an aromatic sulfonic ester of a hydroxyalkyl cellulose with a secondary aliphatic amine containing not more than six carbon atoms, until a product is obtained which is soluble to the extent of at least one part in 99 parts of aqueous acetic acid of some concentration in the range of 1.5 to 20%.

2. The process which comprises reacting a hydroxyalkyl cellulose containing a ratio of hydroxyalkyl to cellulose within the range of 1:8 to 3:1 with an aromatic sulfonyl halide in an inert organic solvent, and reacting the resultant product with a secondary aliphatic amine containing not more than six carbon atoms, until a product is obtained which is soluble to the extent of at least one part in 99 parts of aqueous acetic acid of some concentration in the range of 1.5 to 20%.

3. The process which comprises reacting glycol cellulose containing a ratio of hydroxyethyl to cellulose within the range of 1:8 to 3:1 with an aryl sulfonyl chloride of the benzene series in pyridine, and reacting the resultant product with a secondary aliphatic amine containing not more than six carbon atoms, until a product is obtained which is soluble to the extent of at least one part in 99 parts of aqueous acetic acid of some concentration in the range of 1.5 to 20%.

4. Amino celluloses and salts thereof which amino celluloses are soluble to the extent of at least one part in 99 parts of aqueous acetic acid of some concentration in the range of 1.5–20% and which contain amino nitrogen removed from the cellulose nucleus by an open chain of atoms comprising at least one carbon atom.

5. Amino celluloses and salts thereof which amino celluloses are soluble to the extent of at least one part in 99 parts of aqueous acetic acid of some concentration in the range of 1.5–20% and which contain amino nitrogen removed from the cellulose nucleus by an open hydrocarbon chain.

6. An alkylaminoalkyl cellulose which is soluble to the extent of at least one part in 99 parts of aqueous acetic acid of some concentration in the range of 1.5–20% and the alkylamino group of which contains not more than six carbon atoms.

7. An alkylaminoethylcellulose which is soluble to the extent of at least one part in 99 parts of aqueous acetic acid of some concentration in the range of 1.5–20% and the alkylamino group of which contains not more than six carbon atoms.

8. A dialkylaminoalkyl cellulose which is soluble to the extent of at least one part in 99 parts of aqueous acetic acid of some concentration in the range of 1.5–20% and the dialkylaminoalkyl group of which contains not more than six carbon atoms.

9. Amino cellulose and salts thereof which amino celluloses are soluble to the extent of at least one part in 99 parts of aqueous acetic acid of some concentration in the range of 1.5 to 20% and contain amino nitrogen in an alkylamino group having not more than six carbon atoms which alkylamino group is removed from the cellulose nucleus by an open chain of atoms of one to six carbon atoms.

10. Amino celluloses and salts thereof which amino celluloses are soluble to the extent of at least one part in 99 parts of aqueous acetic acid of some concentration in the range of 1.5 to 20% and which contain amino nitrogen in an alkylamino group of not more than six carbon atoms which alkylamino group is removed from the cellulose nucleus by an open hydrocarbon chain of 1–6 carbon atoms.

11. An alkylaminoalkyl cellulose which is soluble to the extent of at least one part in 99 parts of aqueous acetic acid of some concentration in the range of 1.5 to 20% and the alkylamino group of which contains not more than six carbon atoms and is separated from the cellulosic nucleus by an open hydrocarbon chain of 1–6 carbon atoms.

12. A dialkylaminoalkyl cellulose which is soluble to the extent of at least one part in 99 parts of aqueous acetic acid of some concentration in the range of 1.5 to 20% and the dialkylaminoalkyl group of which contains not more than six carbon atoms and is separated from the cellulosic nucleus by an open hydrocarbon chain of from 1–6 carbon atoms.

13. A dimethylaminopropyl cellulose soluble to the extent of at least one part in 99 parts of aqueous acetic acid of some concentration in the range of 1.5 to 20%.

14. A mixed methyl dimethylaminopropyl ether of cellulose soluble to the extent of at least one part in 99 parts of aqueous acetic acid of some concentration in the range of 1.5 to 20%.

15. An aminoethyl aminoethoxyethyl ether of cellulose soluble to the extent of at least one part in 99 parts of aqueous acetic acid of some concentration in the range of 1.5 to 20%.

VERNAL R. HARDY.